(12) United States Patent
Soe et al.

(10) Patent No.: US 9,345,104 B2
(45) Date of Patent: May 17, 2016

(54) DISPLAY BACKLIGHT POWER CONSUMPTION

(71) Applicant: Intel Corporation, Santa Clara, CA (US)

(72) Inventors: Soethiha Soe, Beaverton, OR (US); Patrick K. Leung, Hillsboro, OR (US); Tod F. Schiff, Portland, OR (US); Scot Lester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 14/210,628

(22) Filed: Mar. 14, 2014

(65) Prior Publication Data

US 2015/0264775 A1    Sep. 17, 2015

(51) Int. Cl.
*H05B 37/02* (2006.01)
(52) U.S. Cl.
CPC ..................................... *H05B 37/02* (2013.01)
(58) Field of Classification Search
None
See application file for complete search history.

(56) References Cited

U.S. PATENT DOCUMENTS

2005/0242772 A1* 11/2005 Cha ............................... 320/115
2008/0191555 A1*  8/2008 Cha ............................... 307/43

\* cited by examiner

*Primary Examiner* — Douglas W Owens
*Assistant Examiner* — Dedei K Hammond
(74) *Attorney, Agent, or Firm* — Jordan IP Law, LLC

(57) ABSTRACT

Systems and methods may provide for a power management apparatus including a first path to be coupled to an output of a narrow voltage direct current (NVDC) charger and an input of a backlight voltage regulator (VR). The apparatus may also include a second path to be coupled to an input of the NVDC charger and the input of the backlight voltage regulator, wherein the second path is to bypass current around the NVDC charger and to the input of the backlight VR if a voltage supplied by a first power source to the NVDC charger exceeds a voltage of a second power source coupled to the output of the NVDC. In one example, the first path includes a first diode and the second path includes a second diode, wherein the first and second diodes form an OR configuration for the apparatus between the first and second paths.

23 Claims, 3 Drawing Sheets

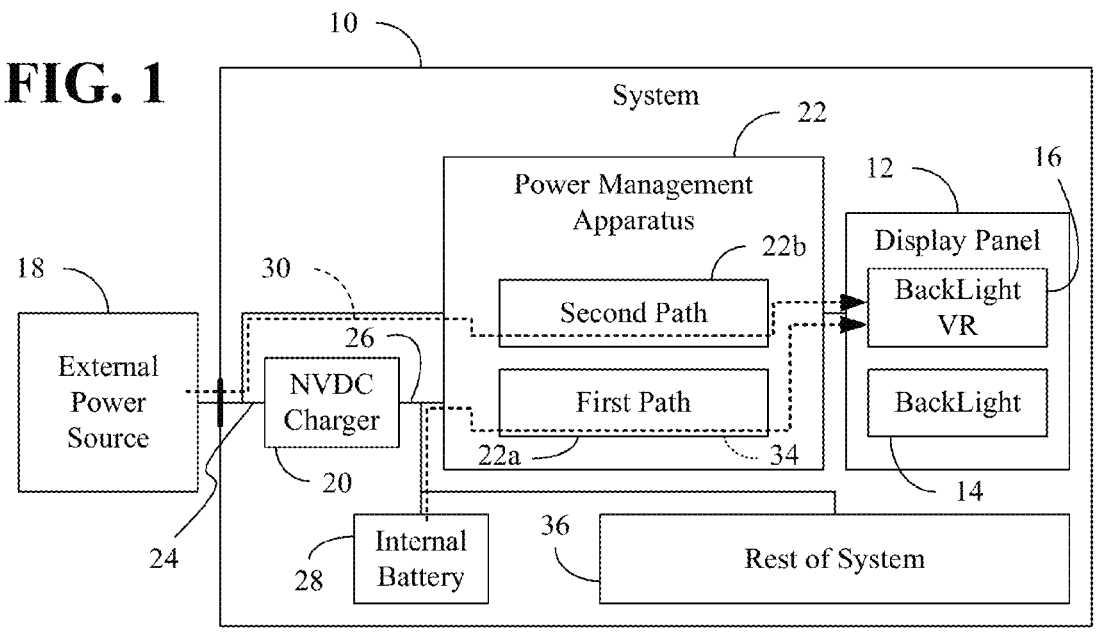

FIG. 1

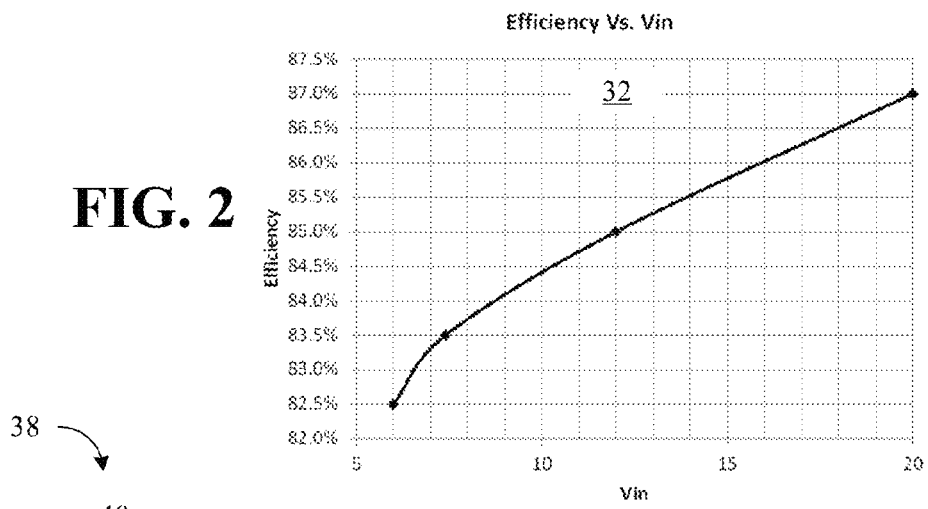

FIG. 2

```
38 ─┐
    ▼
┌─ 40 ─┐
│ Provide a first path between an output of an NVDC charger and an input of a backlight
│ voltage regulator
└──────────────────────────────────────────────────────────────────────────────────┘
    │ 42
    ▼
┌──────────────────────────────────────────────────────────────────────────────────┐
│ Provide a second path between an input of the NVDC charger and the input of the
│ backlight voltage regulator
└──────────────────────────────────────────────────────────────────────────────────┘
    │ 44
    ▼
┌──────────────────────────────────────────────────────────────────────────────────┐
│ Use the second path the bypass current around the NVDC charger and to the input of the
│ backlight voltage regulator if a voltage supplied by a first power source to the input of
│ the NVDC charger exceeds a voltage of a second power source coupled to the output of
│ the NVDC
└──────────────────────────────────────────────────────────────────────────────────┘
```

FIG. 3

DISPLAY BACKLIGHT POWER CONSUMPTION

TECHNICAL FIELD

Embodiments generally relate to reducing power consumption in devices having display backlights. More particularly, embodiments relate to selectively bypassing narrow voltage direct current (NVDC) chargers in mobile devices to reduce display backlight power consumption.

BACKGROUND

Mobile devices such as notebook computers, tablet computers, convertible tablets, and so forth may generally be powered by an internal battery when the device is not connected to an external power source such as an alternating current (AC) adapter or a docking station. When an external power source is connected to the mobile device, a narrow voltage direct current (NVDC) charger in the mobile device may be used to down convert the relatively high voltage of the external power source to a lower voltage. The relatively low voltage output by the NVDC charger may in turn be used to charge the internal battery, power the display panel of the mobile device, power the rest of the device, etc.

Conventional display panels may include a voltage regulator (VR) that boosts the voltage output from the NVDC charger in order to drive a light emitting diode (LED) based backlight that facilitates viewing visual information presented on the display panel. While such an approach may be suitable in certain circumstances, there remains considerable room for improvement. For example, conventional NVDC chargers may encounter efficiency losses while down converting the voltage from the external power source. Moreover, operating the boost VR of the display panel at a relatively low input voltage may result in additional efficiency losses.

BRIEF DESCRIPTION OF THE DRAWINGS

The various advantages of the embodiments will become apparent to one skilled in the art by reading the following specification and appended claims, and by referencing the following drawings, in which:

FIG. 1 is a block diagram of an example of a system having a power management apparatus according to an embodiment;

FIG. 2 is a plot of an example of a relationship between efficiency and input voltage for a voltage regulator according to an embodiment;

FIG. 3 is a flowchart of an example of a method of improving display backlight power consumption according to an embodiment;

DESCRIPTION OF EMBODIMENTS

Figure 4:
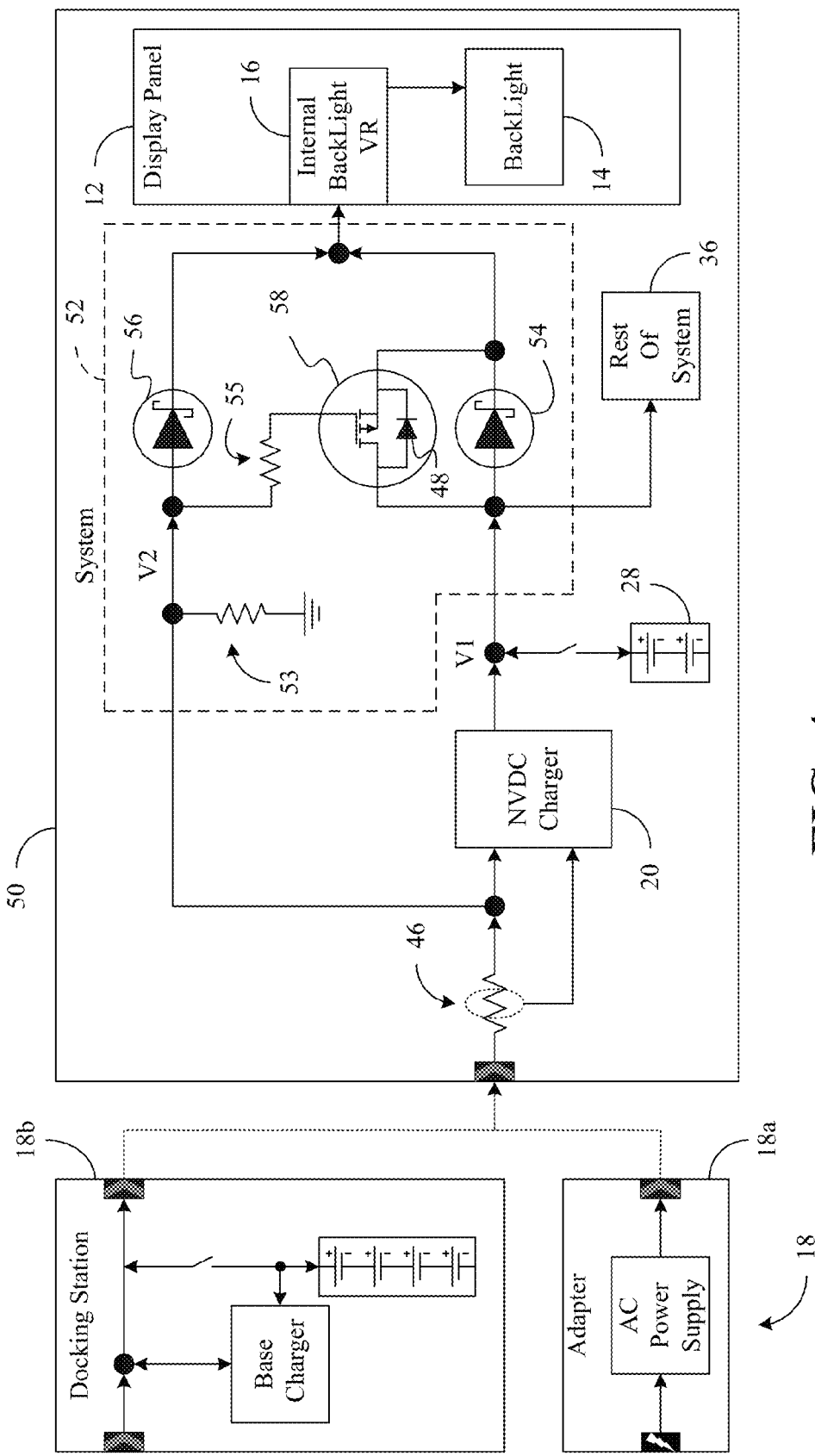
FIG. 4 is a circuit diagram of an example of a system having a power management apparatus with diodes forming an OR configuration between current paths to a display panel according to an embodiment.

Turning now to FIG. 1, a system 10 is shown in which a display panel 12 presents visual information to users of the system 10. The system 10 may include, for example, a notebook computer, tablet computer, convertible tablet, personal digital assistant (PDA), mobile Internet device (MID), smart phone, media player, wearable computer, etc., or any combination thereof. In the illustrated example, the display panel 12 includes a backlight 14 (e.g., light emitting diode/LED, electroluminescent panel/ELP, cathode fluorescent lamp/CFL, etc., based backlight) that is driven by a backlight voltage regulator (VR) 16, wherein the backlight VR 16 outputs a relatively high voltage (e.g., 24-28V, depending upon the number of LEDs being driven). As will be discussed in greater detail, the illustrated backlight VR 16 is configured to accept a relatively wide range of input voltages (e.g., 6-20V) in order to reduce the power consumption of the backlight VR 16 when an external power source 18 (e.g., AC adapter, docking station) also having a relatively high output voltage (e.g., 12-20V) is coupled to the system 10.

More particularly, the system 10 may include a narrow voltage direct current (NVDC) charger 20 having an input 24 and an output 26, an internal battery 28 having a relatively low voltage (e.g., 6-9V) coupled to the output 26 of the NVDC charger 20, and a power management apparatus 22 (22a, 22b). The NVDC charger 20 may generally limit its output 26 to a relatively low voltage (e.g., 6-9V) even when the high voltage external power source 18 is coupled to the system 10. Such an approach may in turn reduce the amount of voltage swing that the remaining components in the system 10 need to account for and may reduce the overall cost and size of the system 10, particularly in small form factor configurations.

The power management apparatus 22 may include a first path 22a coupled to the output 26 of the NVDC charger 20 and the input of the backlight VR 16, and a second path 22b coupled to the input 24 of the NVDC charger 20 and the input of the backlight VR 16. The illustrated second path 22b bypasses current 30 around the NVDC charger 20 and to the input of the backlight VR 16 if the voltage supplied by the external power source 18 to the input 24 of the NVDC charger 20 exceeds the voltage of the internal battery 28 (e.g., when an AC adapter or docking station is connected).

Bypassing the current 30 around the NVDC charger 20 may enable 1) the down conversion inefficiencies of the NVDC charger 20 to be eliminated with respect to driving the backlight 14, and 2) the backlight VR 16 to operate at a higher, more efficient input voltage when the external power source 18 is coupled to the system 10. With continued reference to FIGS. 1 and 2 a plot 32 of the relationship between efficiency and input voltage for the backlight VR 16 demonstrates, for example, that a significant efficiency increase may be realized by operating the input of the backlight VR 16 near the output voltage of the external power source 18 rather than near the lower voltage of the internal battery 28. The resulting power savings may be used to increase processor performance (e.g., operate at "turbo" frequencies), shorten battery charge times (e.g., boost battery charge power), lower system temperatures, design thinner systems, and so forth. Simply put, configuring the operational range of the backlight VR 16 to be greater than the operational range of the NVDC charger 20 may enable power savings to be realized in the backlight VR 16, while maintaining the size and cost benefits of the NVDC charger 20.

If the voltage at the input 24 of the NVDC charger 20 does not exceed the voltage of the internal battery 28 (e.g., when no AC adapter or docking station is connected), the illustrated first path 22a routes current 34 from the internal battery 28 to the input of the backlight VR 16. The NVDC charger 20 and/or internal battery 28 may also be used to power the rest of the system 36. The voltages, efficiency values, etc., provided herein are to facilitate discussion only and may vary depending upon the circumstances.

FIG. 3 shows a method 38 of improving backlight power consumption. The method 38 may be implemented in, for example, fixed-functionality logic hardware using circuit technology such as, for example, application specific integrated circuit (ASIC), complementary metal oxide semiconductor (CMOS) or transistor-transistor logic (TTL) technology, or any combination thereof. Illustrated processing block 40 provides a first path between an output of an NVDC charger and an input of a backlight VR, wherein a second path may be provided at block 42 between an input of the NVDC charger and the input of the backlight VR. Additionally, block 44 may involve using the second path to bypass current around the NVDC charger if a voltage supplied by a first power source to the input of the NVDC exceeds a voltage of a second power source coupled to the output of the NVDC.

Turning now to FIG. 4, a system 50 (e.g., notebook computer, tablet computer, convertible tablet, PDA, MID, smart phone, media player, wearable computer) is shown in which the first path of a power management apparatus 52 includes a first diode 54 and the second path of the power management apparatus 52 includes a second diode 56. In the illustrated example, the first and second diodes 54, 56 form a Boolean OR configuration for the power management apparatus 52 between the first and second paths to the input of the backlight VR 16. More particularly, the external power source 18 (18a, 18b) may include a relatively high voltage AC adapter 18a (e.g., with an AC power supply) or a relatively high voltage docking station 18b (e.g., with a keyboard base charger, 4S battery, etc.), wherein the diodes 54, 56 may take the highest voltage as the power source.

Thus, when the external power source 18 is connected to the system 50, the second diode 56 (e.g., in the second path) may conduct current from the external power source 18 to the input of the backlight VR 16, while the first diode 54 is reverse biased and turned off. Similarly, when the external power source 18 is not connected to the system 50, the first diode 54 (e.g., in the first path) may conduct current from the internal battery 28 (e.g., 2S battery) to the backlight VR 16, while the second diode 56 is reverse biased and turned off. The current for the second diode 56 may be taken after a sense resistor 46 in order for the NVDC charger 20 to account for the power consumption associated with over adapter current protection (OCP) and to monitor system power (e.g., input power minus battery power).

In addition, the first path may optionally include a transistor 58 (e.g., P-channel metal oxide semiconductor field effect transistor/MOSFET) having a gate coupled to the input of the second diode 56 (e.g., "V2" in the second path). In the illustrated example, the transistor 58 is coupled in parallel with the first diode 54 in order to reduce power consumption that would otherwise be dissipated in the first diode 54. Thus, when the external power source 18 is not connected to the system 50 and the internal battery 28 (e.g., "V1") is used, the gate voltage of the illustrated transistor 58 will be grounded through a load resistor 53 and the transistor 58 will turn on. Because the drain-to-source on resistance of the transistor (Rdson) may be lower than the forward bias resistance of the first diode 54, the transistor 58 may bypass current around the first diode 54 when conducting.

If the external power source 18 is connected to the system 50, when the gate voltage of the illustrated transistor 58 reaches the battery voltage minus the threshold voltage ($V_{th}$) of the gate, the transistor 58 will turn off. Turning off the transistor in such a fashion may prevent cross conducting between voltages V1 and V2. If the power management system 52 includes the transistor 58, a timing resistor 55 may optionally be connected between V2 in the second path and the gate of the transistor 58 in order to control how quickly the transistor turns on.

The first and second diodes 54, 56 may be Schottky diodes having a relatively low forward bias voltage drop to minimize the power impact of the power management apparatus 22 on the system 50. Moreover, to the extent that the transistor 58 includes an internal diode 48 (e.g., a body diode), the first diode 54 may be eliminated altogether to further reduce the power consumption of the power management apparatus 22. Even without such optimizations, the efficiency savings provided by the illustrated approach may be substantial relative to conventional systems.

Figure 5:
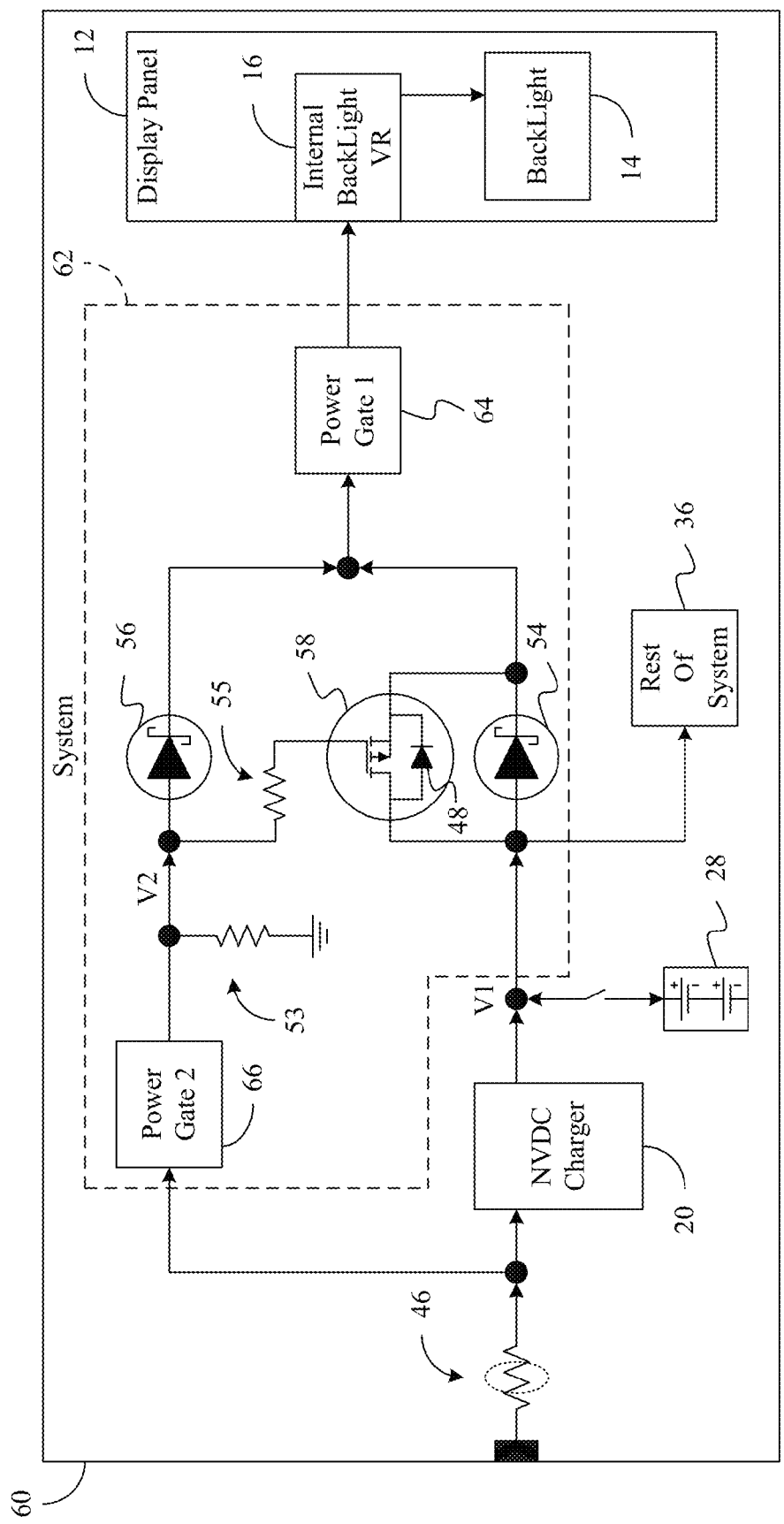
FIG. 5 is a circuit diagram of an example of a system having a power management apparatus with power gates according to an embodiment.

FIG. 5 shows an alternate system 60 (e.g., notebook computer, tablet computer, convertible tablet, PDA, MID, smart phone, media player, wearable computer) in which a power management apparatus 62 further includes a first power gate 64 coupled to the input of the backlight VR 16 to selectively disable the backlight VR 16 based on a signal from a controller (e.g., embedded controller/EC, not shown). Thus, the first power gate 64 may be used to reduce power during low power modes or when the display panel 12 is not used. The first power gate 64 may also provide greater flexibility for control over power sequencing and/or timing to optimize the performance of the display panel 12.

In addition, the second path of the power management apparatus 62 may include a second power gate 66 to selectively disable the second path based on a signal from a controller (e.g., EC, not shown). In this regard, the second power gate 66 may be activated if a low power external power source such as, for example, wireless power or a 10 W adapter is used and the internal battery 28 supplements the system power. The power gates 64, 66 may be implemented as integrated load switches, discrete circuits with MOSFETs, etc., or any combination thereof.

Additional Notes and Examples:

Example 1 may include a system comprising a display panel having a backlight voltage regulator with an input, a narrow voltage direct current (NVDC) charger having an input and an output, an internal battery coupled to the output of the NVDC charger, and a power management apparatus. The power management apparatus may include a first path coupled to the output of the NVDC charger and the input of the backlight voltage regulator, and a second path coupled to the input of the NVDC charger and the input of the backlight voltage regulator, wherein the second path is to bypass current around the NVDC charger and to the input of the backlight voltage regulator if a voltage supplied by an external power source to the input of the NVDC charger exceeds a voltage of the internal battery.

Example 10 may include a power management apparatus comprising a first path to be coupled to an output of a narrow direct current (NVDC) charger and an input of a backlight voltage regulator, and a second path to be coupled to an input of the NVDC charger and the input of the backlight voltage regulator, wherein the second path is to bypass current around the NVDC charger and to the input of the backlight voltage regulator if a voltage supplied by a first power source to the input of the NVDC charger exceeds a voltage of a second power source coupled to the output of the NVDC charger Example 17 may include a method of operating a power management apparatus, comprising providing a first path between an output of a narrow voltage direct current (NVDC) charger and an input of a backlight voltage regulator, providing a second path between an input of the NVDC charger and the input of the backlight voltage regulator, and using the second path to bypass current around the NVDC charger and to the input of the backlight voltage regulator if a voltage supplied by a first power source to the input of the NVDC charger exceeds a voltage of a second power source coupled to the output of the NVDC charger.

Thus, techniques described herein may provide prolonged battery life in dual battery systems, and use reduced NVDC charger power losses and display power consumption to improve system thermal performance and/or reduce system size. Additionally, techniques may use reduced NVDC charger power losses to boost battery charge power and shorten battery charge times, as well as to increase turbo boost capability and achiever better system performance.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
a display panel having a backlight voltage regulator with an input;
a narrow voltage direct current (NVDC) charger having an input and an output;
an internal battery coupled to the output of the NVDC charger; and
a power management apparatus including,
a first path coupled to the output of the NVDC charger and the input of the backlight voltage regulator, and
a second path coupled to the input of the NVDC charger and the input of the backlight voltage regulator, wherein the second path is to bypass current around the NVDC charger and to the input of the backlight voltage regulator if a voltage supplied by an external power source to the input of the NVDC charger exceeds a voltage of the internal battery.

2. The system of claim 1, wherein the first path includes a first diode and the second path includes a second diode, and wherein the first and second diodes form an OR configuration for the power management apparatus between the first and second paths.

3. The system of claim 2, wherein the first path includes a transistor having a gate coupled to the second path.

4. The system of claim 3, wherein the transistor includes the first diode.

5. The system of claim 3, wherein the transistor is coupled in parallel with the first diode.

6. The system of claim 1, wherein the second path includes a power gate to selectively disable the second path based on a signal from a controller.

7. The system of claim 1, wherein the power management apparatus further includes a power gate coupled to the input of the backlight voltage regulator to selectively disable the backlight voltage regulator based on a signal from a controller.

8. The system of claim 1, wherein the backlight voltage regulator includes an operational range that is greater than an operational range of the NVDC charger.

9. The system of claim 1, further including the external power source, wherein the external power source has one or more of a docking station or an alternating current (AC) adapter.

10. A power management apparatus comprising:
a first path to be coupled to an output of a narrow voltage direct current (NVDC) charger and an input of a backlight voltage regulator; and
a second path to be coupled to an input of the NVDC charger and the input of the backlight voltage regulator, wherein the second path is to bypass current around the NVDC charger and to the input of the backlight voltage regulator if a voltage supplied by a first power source to the input of the NVDC charger exceeds a voltage of a second power source coupled to the output of the NVDC charger.

11. The apparatus of claim 10, wherein the first path includes a first diode and the second path includes a second diode, and wherein the first and second diodes form an OR configuration for the apparatus between the first and second paths.

12. The apparatus of claim 11, wherein the first path includes a transistor having a gate coupled to the second path.

13. The apparatus of claim 12, wherein the transistor includes the first diode.

14. The apparatus of claim 12, wherein the transistor is coupled in parallel with the first diode.

15. The apparatus of claim 10, wherein the second path includes a power gate to selectively disable the second path based on a signal from a controller.

16. The apparatus of claim 10, further including a power gate coupled to the input of the backlight voltage regulator to selectively disable the backlight voltage regulator based on a signal from a controller.

17. A method of operating a power management apparatus, comprising:

providing a first path between an output of a narrow voltage direct current (NVDC) charger and an input of a backlight voltage regulator;

providing a second path between an input of the NVDC charger and the input of the backlight voltage regulator; and using the second path to bypass current around the NVDC charger and to the input of the backlight voltage regulator if a voltage supplied by a first power source to the input of the NVDC charger exceeds a voltage of a second power source coupled to the output of the NVDC charger.

18. The method of claim 17, wherein a first diode of the first path and a second diode of the second path are used to form an OR configuration for the apparatus between the first and second paths.

19. The method of claim 18, wherein a transistor having a gate coupled to the second path is used to provide the first path.

20. The method of claim 19, wherein the transistor is used as the first diode.

21. The method of claim 19, wherein the transistor is coupled in parallel with the first diode to provide the first path.

22. The method of claim 17, further including selectively disabling the second path based on a signal from a controller.

23. The method of claim 17, further including selectively disabling the backlight voltage regulator based on a signal from a controller.

* * * * *